UNITED STATES PATENT OFFICE.

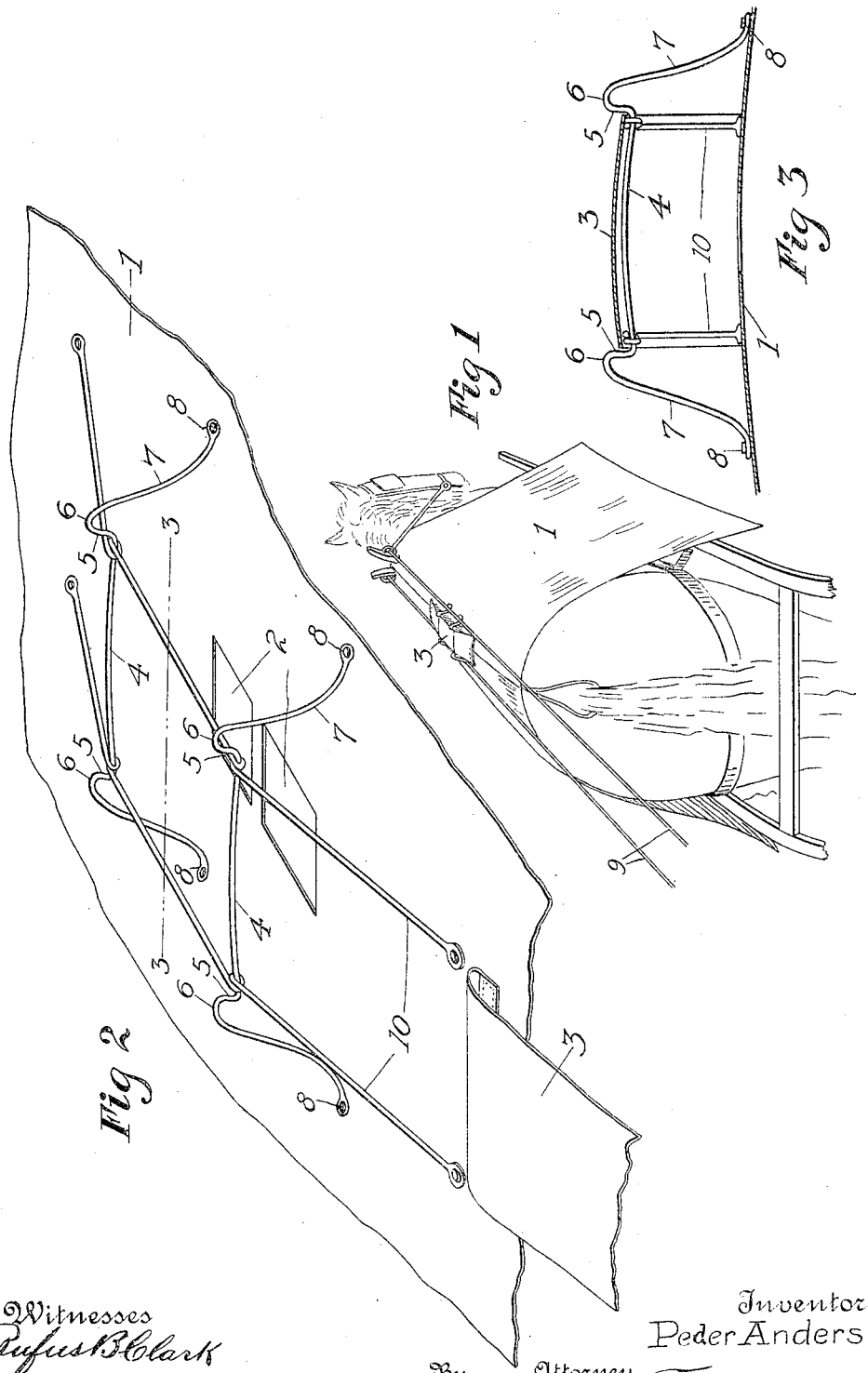

PEDER ANDERSEN, OF SEATTLE, WASHINGTON, ASSIGNOR TO OLE HANSON, OF SEATTLE, WASHINGTON.

HORSE-BLANKET.

No. 808,803. Specification of Letters Patent. Patented Jan. 2, 1906.

Application filed February 15, 1905. Serial No. 245,766.

*To all whom it may concern:*

Be it known that I, PEDER ANDERSEN, a citizen of the United States of America, and a resident of the city of Seattle, in the county of King and State of Washington, have invented certain new and useful Improvements in Horse-Blankets, of which the following is a specification.

My invention relates to certain new and useful improvements in blankets for live stock, being particularly adapted for draft-animals; and the primary object thereof is to provide a blanket which is formed with a means of ventilation, whereby undue accumulation of animal heat under the blanket is prevented, with an improved cover or weather-shield.

Further objects and advantages will be set forth in the following description.

In the accompanying drawings, in which like numerals of reference indicate like parts throughout the several views, Figure 1 is a view in perspective, showing the application of my improvement. Fig. 2 is a view in perspective of that portion of the blanket which is formed with the means for ventilation and the arched frame extending thereover, the cover or shield being removed from the frame and being shown fragmentarily. Fig. 3 is a section taken on line 3 3 of Fig. 2 with the cover in position.

In carrying out my invention I form the blanket 1, shown as applied to a horse for purposes of illustration, with a ventilator consisting of openings 2, which are preferably spaced apart in that portion of the blanket which is adapted to extend directly over the back of the horse. The ventilator-openings are therefore at the highest point occupied by the blanket when arranged on the animal, and consequently the rising animal heat under the blanket will be permitted to freely pass therethrough. As a means for preventing water, snow, and the like from gaining access through these openings I provide a cover or shield 3. This I support at a suitable distance above the ventilator-opening by an open or skeleton wire frame, which I will now describe. This frame consists of laterally-extending arched wires, the top cross-bars 4 of which form seats for the cover 3, the wires at the end of these cross-bars being bent upwardly at 5, thereby forming shoulders which prevent lateral displacement of the cover 3 and then curving outwardly at 6 and continuing in diverging legs or guards 7, the lower ends of which are secured, as by rivets 8, to the blanket. It will be observed that the upper ends of the legs are spaced from the seats 4 by the curved portions 6. Therefore should the reins 9 ride up the legs they will be guided clear of the edges of said cover 3.

10 indicates longitudinal stay-wires, which are wrapped around the cross-bars 4 of the lateral wires and have their end portions inclined downwardly and secured to the blanket, as shown. The cover 3, which is preferably of fabric, is of greater width than the ventilator-openings 2 and rests on these longitudinal wires 10, (see Fig. 3,) being snugly received between the shoulders of the lateral arched wires and having its end portions inclined downwardly over the inclined end portions of said longitudinal wires and secured, as by stitching, (see Fig. 2,) to the blanket.

The invention in its embodiment is simple of construction and can be readily attached to the blankets or other coverings for live stock, and, as is obvious, if found desirable, the number of ventilation-openings provided with my improvement can be readily varied without departing from the spirit of my invention.

Having thus described my invention, what I claim as new, and desire to secure by Letters Patent of the United States of America, is—

1. A covering for live stock formed with an opening, a cover extending over said opening and being spaced therefrom, and guards arranged at opposite sides of said cover and extending above the same to prevent the reins from catching under said cover.

2. A covering for live stock formed with a ventilator-opening, opposite legs secured to said covering, cross-bars secured to said legs and being arranged below the upper ends thereof, and a cover supported on said cross-bars and extending over the opening in said covering.

3. A blanket formed with a ventilator-opening, a cover extending over said opening and having its opposite end portions secured to the blanket, and a frame for supporting the cover, having guards projecting above the edges of said cover.

4. A blanket provided with a ventilator-opening, a cover, and an open frame for supporting said cover over said ventilator-opening, said frame comprising arched wires having their ends secured to the blanket on opposite sides of said ventilator-opening, and stay-wires secured to said arched wires and having their ends secured to the blanket.

5. A blanket provided with a ventilator-opening, arched wires extending over said ventilator-opening and having their ends secured to the blanket, wires secured and extending at an angle to said first wires and having their end portions inclined downwardly and secured to the blanket, and a cover supported by said wires and having its ends resting on the end portions of the last-named wires.

6. A blanket provided with a ventilator-opening, a cover therefor, and means for supporting said cover over the opening, said means comprising spaced-apart arched wires formed with leg portions secured to the blanket and having their upper portions bent inwardly and downwardly and merging in cross-bars on which said cover rests.

7. A blanket provided with a ventilator-opening, a plurality of spaced-apart arched wires formed with leg portions having their upper portions bent inwardly and downwardly and continuing in cross-bars, and a cover supported on said bars and having its ends secured to the blanket.

8. A blanket provided with a ventilator-opening, a cover therefor, and a frame for supporting said cover comprising lateral arched wires secured to the blanket and being formed with seats in which said cover is engaged, and longitudinal wires secured to the lateral wires and having their end portions inclined downwardly and secured to the blanket, said cover extending down over the inclined portions of the longitudinal wires and being secured to the blanket.

Signed at Seattle, Washington, this 24th day of January, 1905.

PEDER ANDERSEN.

Witnesses:
 ARLETA ADAMS,
 GEORGE R. TENNANT.